United States Patent
Krause et al.

(10) Patent No.: US 11,416,642 B2
(45) Date of Patent: Aug. 16, 2022

(54) PREPARATION OF A THREE-DIMENSIONAL MODEL FOR DATA TRANSMISSION

(71) Applicant: Siemens Aktiengesellschaft, Munich (DE)

(72) Inventors: Stefan Krause, Leipzig (DE); Christian Lipp, Waldkirchen (DE); Alexander Nowitschkow, Munich (DE); Peter Robl, Röhrnbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/053,908

(22) PCT Filed: Apr. 25, 2019

(86) PCT No.: PCT/EP2019/060549
§ 371 (c)(1),
(2) Date: Nov. 9, 2020

(87) PCT Pub. No.: WO2019/214949
PCT Pub. Date: Nov. 14, 2019

(65) Prior Publication Data
US 2021/0264070 A1    Aug. 26, 2021

(30) Foreign Application Priority Data
May 9, 2018   (EP) .................................... 18171518

(51) Int. Cl.
*G06F 30/12*   (2020.01)
*G06T 19/20*   (2011.01)
(Continued)

(52) U.S. Cl.
CPC .............. *G06F 30/12* (2020.01); *G06T 19/20* (2013.01); *G06F 2111/04* (2020.01);
(Continued)

(58) Field of Classification Search
None
See application file for complete search history.

(56) References Cited

U.S. PATENT DOCUMENTS 6,614,430 B1 *   9/2003   Rappoport .............. G06F 30/17
                                                      345/420
6,944,513 B1 *   9/2005   Tomomitsu ............. G06F 30/17
                                                      700/98

(Continued)

OTHER PUBLICATIONS

Chu C-H et al; Multi-agent collaborative 3D design with geometric model at different levels of detail; Jan. 11, 2007; Robotics and Computer Integrated Manufacturing, Elsevier Science Publishers BV., Barking, GB, vol. 25, No. 2, pp. 334-347, XP025715186, ISSN: 0736-5845 (Year: 2007).*

(Continued)

*Primary Examiner* — Joni Hsu
(74) *Attorney, Agent, or Firm* — Slayden Grubert Beard PLLC (57) ABSTRACT

Various embodiments include a method for preparing a three-dimensional model for a fabrication component in the context of production for data transmission to different receiving entities comprising: receiving three-dimensional model data via an input interface; providing a detail-state for processing of the three-dimensional model on the respective receiving entity; and executing a reduction algorithm on a reference version of the received three-dimensional model data for automatically calculating and providing a reduced reference version with the provided detail-state.

9 Claims, 3 Drawing Sheets

(51) Int. Cl.
  *G06F 111/20* (2020.01)
  *G06F 111/04* (2020.01)
  *G06F 111/18* (2020.01)

(52) U.S. Cl.
  CPC ....... *G06F 2111/18* (2020.01); *G06F 2111/20* (2020.01); *G06T 2219/2021* (2013.01)

(56) References Cited

U.S. PATENT DOCUMENTS

| | | | | |
|---|---|---|---|---|
| 2009/0187384 | A1* | 7/2009 | Nonaka | G06F 30/13 |
| | | | | 703/1 |
| 2012/0109591 | A1* | 5/2012 | Thompson | G06F 30/00 |
| | | | | 703/1 |
| 2018/0032649 | A1* | 2/2018 | Buckman | G11B 5/012 |
| 2019/0174769 | A1* | 6/2019 | Dingman | G06F 3/0481 |
| 2020/0380739 | A1* | 12/2020 | Ansorregui | H04L 9/0825 |

OTHER PUBLICATIONS

Search Report for International Application No. PCT/EP2019/060549, 10 pages, dated Aug. 19, 2019.
Search Report for EP Application No. 18171518.6, 6 pages, dated Sep. 19, 2018.
Chu C-H et al: "Multi-agent collaborative 3D design with geometric model at different levels of detail", Robotics and Computer Integrated Manufacturing, Elsevier Science Publishers BV., Barking, GB, vol. 25, No. 2, pp. 334-347, XP025715186, ISSN: 0736-5845, Jan. 11, 2007.

* cited by examiner

PREPARATION OF A THREE-DIMENSIONAL MODEL FOR DATA TRANSMISSION

CROSS-REFERENCE TO RELATED APPLICATIONS

This application is a U.S. National Stage Application of International Application No. PCT/EP2019/060549 filed Apr. 25, 2019, which designates the United States of America, and claims priority to EP Application No. 18171518.6 filed May 9, 2018, the contents of which are hereby incorporated by reference in their entirety.

TECHNICAL FIELD

The present disclosure relates to three-dimensional modeling. Various embodiments may include methods, reduction modules, and/or computer programs for providing different versions of a three-dimensional model for use in production.

BACKGROUND

Computer aided systems (CAD systems) provide electronic support in engineering industry. CAD is mainly used for detailed engineering by means of three-dimensional models (in this application also abbreviated as '3D model') of physical components, but it is also used throughout the engineering process from conceptual design and layout of products, through strength and dynamic analysis of assemblies and for generating measurement programs and quality features for measurement devices to definition of manufacturing methods of components.

In the course of production of a technical component or system, it is often necessary to exchange 3D model information between different parties, e.g. product development, clients, or different user groups among others. However, this data exchange involves a considerable security risk, because the different parties require different security levels; for example, in development engineer needs to have all information and a high level of detail of the 3D model, whereas a client only requires a part of the 3D model data and generally requires a lower level of detail.

Thus, the 3D data model should not be exchanged in the same manner for different receiving nodes or parties in order to comply with security standards. In known systems, it is therefore necessary to manually adapt the 3D model before intented data exchange to other entities. In particular, critical data in the model are deleted by hand one after the other. This approach is cumbersome and error prone.

SUMMARY

The teachings of the present disclosure include an improved approach to prepare 3D data models for data transmission to a plurality of receiving entities, which differ in their requirements with respect to detailedness of model data. In particular, the security of the data exchange of 3D model data should be increased. For example, some embodiments of the teachings herein include a method for preparing a three-dimensional model (m) for a fabrication component in the context of production for data transmission to different receiving entities (C), comprising the following steps: receiving (S1) three-dimensional model data (m) via an input interface (i1); providing (S2) a detail-state for processing of the three-dimensional model on the respective receiving entity (C); and executing (S3) a reduction algorithm (X2) on a reference version (m') of the received three-dimensional model data (m) for automatically calculating and providing (S4) at least one reduced reference version (rm') with the provided detail-state.

In some embodiments, the detail-state is provided specifically for each receiving entity (C) and wherein providing (S3) comprises: receiving (S21) context data (cd) specifying in which technical context the three-dimensional model (m) will be used for processing on the receiving entity (C); and accessing (S22) a rules engine (RE) with an associated rules database (RDB) with the received context data (cd) in order to provide the detail-state algorithmically, indicating a respective level of detail in which the reduction algorithm (X2) should be operated with.

In some embodiments, the reduction algorithm (X2) deletes, adds and/or modifies determined elements in the reference version (m') of the 3D model based on the provided detail-state, wherein all references to the determined elements are deleted, too.

In some embodiments, the method further comprises storing (S5) the reduced reference version (rm') of the 3D model with a digital reference to the 3D model (m).

In some embodiments, the context data (cd) specify a context and/or a functionality in which the 3D model is intended to be used on the receiving entity (C), in particular a process step and/or an assembly step during production and/or assembly.

In some embodiments, the reduced reference version (rm') is prepared for being provided on smart glasses (ARG) of a receiving entity (C).

In some embodiments, the method is executed in a batch mode in a central management system (PLM) and/or in a local application (CAD).

In some embodiments, the reduced reference version (rm') is compared with the three-dimensional model (m).

In some embodiments, the method is executed in a CAD system (CAD) and wherein the input interface (i1) is an API interface of the CAD-system which may access a second set of functions (F2) of the CAD system (CAD).

As another example, some embodiments include an eduction module for preparing a three-dimensional model (m) for a fabrication component in the context of production for data transmission to different receiving entities (C), comprising: an input interface (i1) for receiving 3D model data (m); and a processor (P) for providing a detail-state of a receiving entity (C) for processing the three-dimensional model and wherein the processor (P) is further adapted to execute a reduction algorithm (X2) on a reference version (m') of the received 3D model data (m) for automatically calculating and providing at least one reduced reference version (rm') thereof with the provided detail-state.

As another example, some embodiments include a computer program with program code for executing a method as described herein, if the computer program is executed on an electronic device (100, P, CAD).

BRIEF DESCRIPTION OF THE DRAWINGS

The following detailed description of the figures uses the drawings to discuss illustrative embodiments, which are not to be construed as restrictive, along with the features and further advantages thereof. In the drawings.

DETAILED DESCRIPTION

Some embodiments of the teachings herein include a method for preparing a three-dimensional (3D) model—to be used for a fabrication component in the context of production—for data transmission to different receiving entities. The receiving entities differ in their respective security requirements. For example, a first entity (e.g. a developer client) needs to be provided with all of the 3D model data and thus a high degree of detailedness, whereas a second entity (e.g. a service client) only needs to be provided with less data and thus with a low degree of detailedness. The different levels of detailedness are represented in a so-called detail-state. In some embodiments, a method comprises the following steps:

Receiving 3D model data of an (original) 3D model via an input interface, which may be provided as API interface of a CAD system;

Providing a detail-state for processing of the three-dimensional model on the respective receiving entity. The detail-state represents the requirements of the respective receiving entity with respect to detailedness of the model to be processed;

Executing a reduction algorithm on a reference version of the received 3D model data for automatically calculating at least one reduced reference version (being related to the received 3D model data) in the provided detail-state; and Providing the reduced reference version of the 3D model for data transmission to the respective receiving entity.

In some embodiments, a method automatically prepares different security versions or derivations as so called reduced reference versions of an original 3D model which are intended to be transferred to different receiving entities, wherein the different receiving entities do have different security requirements. This has the technical advantage, that the reduced reference versions may be calculated beforehand in a preparation phase so that data transmission to the client entity may be executed much more faster and safer. There is no longer a need for manual adaption of the 3D model data. Further, one specific reduced reference version is selectively dedicated to and provided for a receiving entity. Thus, each receiving entity has its own reduced reference version it is provided with.

For calculating or computing the reduced reference versions, instructions are generated that are compatible with the application programming interface (API) of a CAD software system which is used to transmit the instructions to a kernel of the CAD system. The kernel provides calculation functionalities. The kernel provided CAD functionalities are assessed by the instructions to calculate the reduced reference versions. The calculated reduced reference versions are linked to and/or refer to the original 3D model (storage address in a memory).

In some embodiments, the detail-state is provided dedicatedly for a specific receiving entity or a group thereof (e.g. a group of receiving entities which have the similar functionality and similar or the same security requirements) and wherein the step of providing the detail-state comprises:

Receiving context data specifying and representing in which technical context the receiving entity (e.g. development, service) will use the reduced version of the 3D model; and Accessing a rules engine and/or a rule database with the received context data in order to algorithmically deduce and provide the detail-state of the receiving entity, indicating requirements for a respective level of detail, according to which the reduction algorithm should be operated with. The context data are processed by means of executing a requirement algorithm in order to automatically calculate the detail-state from the context data. The requirement algorithm processes as input the context data and provides as output a set of requirements with respect to the detailedness of the model. This has the technical advantage that the regulations and provisions for calculation of the detail-state (i.e. the rules to calculate the detail-state) may be amended independently of the sending or receiving system and even during execution of the method.

In some embodiments, the detail-state is automatically calculated by processing affiliation data of the respective receiving entity. The affiliation data may thus indicate an affiliation to a functional processing group (e.g. the group of receiving entities which are adapted for the integration and fitting of a technical component during the course of production or attachment of the component to other components). In case the receiving entity is a client device (e.g. a client computer), client group data or user group data might be processed for providing the detail-state (e.g. all clients in a developing group need to be provided with a high degree of detailedness of the 3D model, whereas each client in an assembly group only need to be provided with a lower degree of detailedness, which may be specific for a single process step.

In some embodiments, the reduction algorithm deletes, adds, and/or modifies determined elements in a reference version of the (original) 3D model—and thus in a reference copy of the received 3D model data—based on the provided detail-state, wherein all references to the determined elements are deleted, too. The determined elements (i.e. the elements in the 3D model data, which need to be deleted or made unreadable) may be identified by means of an indication in the detail-state. The reduction algorithm does not only delete model parts or elements, but may also newly generate additional elements, like e.g. adding a new layer and adding 3D units to the new layer. Further, the reduction algorithm may rename models and model parts and/or generate different formats for the model (step, STL, IGS etc.). The reduction algorithm may also amend and change the model or parts thereof.

In some embodiments, the method further comprises:

Storing the reduced reference version of the 3D model with a digital or electronic reference to the (original, unamended) 3D model. This has the technical advantage that all model amendments (reductions) and all the different reduced model versions are trackable. In some embodiments, meta data of the model reduction (execution of the reduction algorithm) are detected and stored so that every model amendment is transparent and traceable. The reference may be provided as a link (url link). For providing the link, a PDM/PLM system may be used (PLM: Product lifecycle management, PDM: Product Data Management). In some embodiments, an invalidation process may be implemented and provided that makes sure that all derivations of the original model—and thus all reduced reference versions of the original model—will automatically become invalid (and will automatically be invalidated) if the original model has been changed. In some embodiments, an adaption algorithm may be provided, which adapts all reduced reference versions (derivations) of the original model, which has been changed according to these changes. Thus, if the original model will be changed, then it is assured that automatically all derived or dependent models will be changed accordingly, too.

In some embodiments, the context data specify a context and/or a functionality in which the 3D model is intended to be used on the receiving entity and in particular a process step, in particular an assembly step, during development, production and/or assembly (of a technical or physical component in a complex system, e.g. a machine or the like). As an advantage, the process step is decisive for calculation of the detail-state. Thus, the provisioning (calculation) of the detail-state is based on additional parameters which indicate a usage or application of the 3D model.

In some embodiments, the reduced reference version is prepared for being provided (transmitted) on smart glasses, comprising augmented reality (AR) glasses or virtual reality (VR) glasses. Smart glasses are wearable computer glasses that add information alongside or to what the user sees during his work on the technical component (e.g. during assembly). Superimposing 3D model information onto a field of view is achieved through an optical head-mounted display (OHMD) or embedded wireless glasses with transparent heads-up display (HUD) or augmented reality (AR) overlay that has the capability of reflecting projected digital images as well as allowing the user to see through it, or see better with it (e.g. by providing annotations with respect to the technical component, like which tools are necessary to assembly the component in the system or on which exact position the component is to be placed). Smart glasses may utilize cellular technology or Wi-Fi. In some embodiments, modern smart glasses may be equipped with effective wearable computers which can run self-contained mobile apps, in particular the model detailing application or a client version of the same in order to provide the reduced reference version of the 3D model locally on the smart glasses. In some embodiments, the smart glasses are handsfree that can communicate with the Internet via natural language voice and/or gesture commands. Optionally, touch buttons may be used.

The reduced reference version data may be prepared to be transmitted directly to the smart glasses or indirectly, namely may be firstly transmitted to a receiving client device, e.g. a mobile device and/or a beamer et cetera and secondly from the receiving client device to the associated smart glasses. This feature makes production more flexible in that the necessary reduced reference version of the 3D model is provided locally on-site and directly at a location, where the user is working and processing on the component. As a major technical advantage, only those data are to be transmitted to the local site (e.g. smart glasses or client computer of the receiving device) which are relevant in that processing step during production. Thus, only a small selection of data needs to be transmitted to the receiving entity which has the advantage that standby time and waiting periods for generation of the visualization may be reduced significantly.

In some embodiments, the method is executed in a batch mode in a central management system (e.g. a product lifecycle management system—PLM) or in a local application (computer aided design system—CAD). This has the advantage that the automatic preparation of the reduced 3D models for transmission may be automated still further, which in the end reduces failure sources and helps to accelerate assembly. The method may be executed as a computer application, which may be hosted on different systems (e.g. centrally/PLM or locally/CAD).

In some embodiments, the (calculated) reduced reference version may be compared with the original 3D model for further analysis (first level of comparison: comparing original model with derived model). The result of this comparison is stored. Again, the result of this comparison may—in a second level of comparison—be compared with other comparison results for other versions. This comparing step may be executed by using functions from the CAD system. Thus, a two level comparison may be implemented for the derived models and its depending comparison results.

Advantages, features, and example embodiments which have been described with respect to the method, may equally be applied to the proposed solution according to the apparatus or reduction module and vice versa. Respective functional features (e.g. comparing with the original 3D model) are deployed in functional modules, which are adapted to execute the respective function (in the example, given above, a comparator module), wherein the modules are to be construed as software modules and/or hardware modules to be executed in a computing entity.

In some embodiments, there is a reduction module for preparing a three-dimensional (3D) model for data transmission to different receiving entities. The 3D model is used for a fabrication component in the context of production. As already mentioned above, the receiving entities differ in their respective security requirements and therefore need to be provided with different levels or degrees of detailedness. Thus, detail-state specific versions of a three-dimensional model are automatically pre-calculated. In some embodiments, the reduction module comprises:

An input interface for receiving 3D model data, which may preferably be provided as application programming interface of a CAD system; and A processor for providing a detail-state for processing the three-dimensional model on the respective receiving entity. The processor is further adapted to execute a reduction algorithm on a reference version of the received 3D model data for automatically calculating and providing at least one reduced reference version with the provided detail-state.

The reduction module may relate to a computer program product with a computer program stored thereon. The computer program is adapted to execute the methods described above. The computer program product may or comprise a computer readable storage medium.

In some embodiments, there is an application or computer program, tangibly embodying a program of machine-readable instructions executable by a digital processing apparatus to perform the preparation method with the reduction algorithm described above, if the application or program is executed on the digital processing apparatus device (e.g. in a central administration system, like a product lifecycle management system or in a central or local CAD system). In particular, the application refers to a model detailing application, which is adapted to provide the 3D model in the reduced level of detail, required by the specific client or receiving entity. Thus, the method may be provided as a computer program with program code for executing the preparation method, mentioned above, if the computer program is executed on an electronic device (inter alia a PLM system or CAD system). The preparation method preferably uses the CAD system and more specifically functions of the CAD kernel.

In some embodiments, the reduction algorithm is based on functions of the CAD kernel. Moreover, the step of comparing the derived (reduced) versions with the original model is based on functions of the CAD kernel, too. For this reason, the CAD system needs to be started or needs to be assessed via an API interface with special instructions. The functions to be executed by the CAD system may be operated (executed) as a hidden service according to the instructions provided by the preparation method or by the modelling detailing application. The instructions serve to calculate reduced versions of the 3D model in the provided detail-state, to analyze versions of the 3D model, to amend and/or store versions, to aggregate different versions and/or to add context data and/or meta data to the 3D model data.

In the following a short definition of terms is given. Generally, the proposed solution may be used in the context of production, sales (e.g. for configuration), analysis, product assembly, quality and service processes for technical products.

A 3D model (three-dimensional model) is a mathematical representation of any surface and/or structure of an object in three dimensions via specialized software, especially CAD system software. The CAD system may only be accessed via an application programming interface (API) and not via the (normal) user interface thereof to access the CAD kernel with respective functionality. The product is called a 3D model. The model may thus represent a technical or physical object or body (in particular a component to be integrated in a technical system or machine) using a collection of points in 3D space, connected by various geometric entities such as triangles, lines, curved surfaces, etc. Being a collection of digital data (or an electronic dataset), comprising geometric data of the component and/or structural data, referring to the composition of matter and/or to the attachment requirements of the component, 3D models are typically created algorithmically (procedural modeling) or scanned. Their surfaces may be further defined with texture mapping procedures for applying different surface structures. 3D models are widely used in engineering, production, e.g. in CAD systems. The 3D model data represents the respective 3D model and may be construed in a similar manner.

Receiving entity may be a computer-based entity of a client. Typically, several local clients may be connected via a network (wired or wireless) to a central computer entity (e.g. a PLM-System or a CAD system), which may be adapted to manage the data to be provided for the connected local clients. A receiving entity, may, for example, be a CAD system. A client may comprise more than one receiving entity. The receiving entities differ in their technical context and functionality and thus in their security level. In a preferred embodiment the receiving entity comprises smart glasses, like AR glasses.

The detail-state is an electronic dataset which defines the requirements of the respective client for detailedness of the 3D model. The detail-state refers to a specific client/receiving entity or to a group thereof (e.g. receiving entities with same or equal functionality). The detail-state may be calculated and provided on an external instance and may be read in by the model reduction application or it may be calculated on the respective computing entity which is also responsible for processing the model reduction application and for providing the reduced 3D model. The detail-state may be provided, by:

Receiving context data from the receiving entity of the client, specifying in which technical context (e.g. development, service) the 3D model will be used; and Accessing a rules engine or a rule database with the received context data in order to provide the detail-state, indicating requirements for a respective level of detail. Providing the detail-state may be based on user group data or data, referring to the group of receiving entities with associated functionality. In a technical sense, the functionality of a receiving entity of a client to process the 3D model is associated to a certain group of clients.

The detail-state may comprise three different categories:

Low—e.g. shell geometry for constructional validation;

Middle—e.g. model with PMI information and feature information for CAM programming; and High—e.g. model with additional information, like for a wired terminal box with detailed information relating to internal functions. In a high detail-state the 3D model data may comprise the following parameters: KE (constructional element), PMI (Product Manufacturing Information), format (e.g. STEP, JT, NX, CREO, STL, . . . ) and group or process step information (planer, operator, sales, . . . ).

In a configuration phase additional states may be defined. In some embodiments, the rules engine is modular.

The reduction algorithm refers to an algorithm, executed on a computer. The reduction algorithm deletes, modifies, and/or adds selected elements in the 3D model based on the provided detail-state, wherein all references to the selected elements are deleted, too. The reduction algorithm needs to access the reference version of the original 3D model data and needs to receive a detail-state with requirements with respect to required detailedness of the receiving client, in order to generate and calculate a reduced reference version of the 3D model which is dedicated for the respective client and processing thereon. The reduction algorithm may be initiated automatically, as soon as the 3D model needs to be transferred to or to be provided on a receiving entity. It may be executed in a batch mode. The reduction algorithm preferably accesses a rule database, in which rules are stored for calculating instructions, which particular element(s) in the (original) 3D model is (are) to be deleted in which manner (totally or in part, with references to the element be maintained or deleted, etc. and by using what kind of reduction, like deletion, anonymization or de-identification of the respective element in the 3D model data set).

In some embodiments, the reduction algorithm uses functions of a local computer aided design application (CAD application). It uses the API (application programming interface) of the CAD system to access the CAD kernel for hidden execution of functions of the CAD application.

The preparation method of the proposed solution may be defined in a high level language, like C, C #or C++ and uses the functions of the CAD system via its API functions. These API functions may access the CAD kernel and may thus use all procedures provided by the CAD system to amend the 3D model without using the user interface of the CAD system. This approach makes it possible to also use functions of the CAD system which are not accessible via the (normal) user interface of the CAD system and thus to execute a function as a 'hidden service'. This has the advantage to extend the functionality of the application software. By using the API functions, the 3D model data are received and may be processed (for calculating the reduced reference version of the 3D model) according to the provided detail-state or according to a result of a rules engine. In some embodiments, the calculated reduced reference version of the 3D model is validated in order to assure that the generated model derivations are still a valid model.

The reduced reference version of the original 3D model is calculated automatically by means of a computer by applying the reduction algorithm. The reduction algorithm is operated according to the detail-state. The reduction algorithm may access a rule database for storing rules, which may be amended independent of the 3D model and of the client requirements.

One of the main problems is to handle the provision of technical 3D data for different clients or receiving entities C in different technical contexts (e.g. product development, product assembly, product service etc.). Each of the receiving entities may for example have different functions or tasks and therefore needs to be provided with different parts of the underlying 3D model. Depending on the technical context for processing the 3D model, different requirements of the 3D model data exist with respect to the required level of detail. For example, a first operator who is working on a first processing step in product construction needs a first set of 3D model data, whereas a second operator needs a second set of 3D model data, which may e.g. more detailed or more general than the first set.

A model detailing application MDA is proposed which serves to provide a reduced reference version rm' of an original 3D model m, based on a reference version m'. In this context, therefore, the 'model detailing application MDA' is a synonym to the 'method for preparing a 3D model' as claimed. The reduced reference version rm' is characterized in that it is a computed derivation of the original 3D model and only comprises data in compliance with a provided detail-state. This has the technical advantage that security may be improved as on the one hand no unnecessary data will be exchanged and on the other hand by assuring that the respective client with its functionality and processing context is provided with the 3D model data it needs and it is allowed to access.

The model detailing application MDA may be used and accessed directly in the CAD client system or may be provided indirectly via the PLM client. At the PLM client a CAD software needs to be executed in batch mode. The model detailing application MDA is adapted to generate derivations of an original (released) 3D model according to the detail-state and according to rules, stored and processable in a rules engine RE. The rules may be pre-configured and also may be configured via a user interface UI of the modeling detailing application MDA. The derivation of amended (reduced or enriched) model versions may thus be executed in an efficient and fast manner for each process step of a production process dedicatedly. In some embodiments, a reduced reference version of the 3D model is prepared for each process step separately. Further, the prepared 3D model derivations serve to control the productional process by providing control data for each different process step separately. For example, the respective machine to be used for production in a multi-step production process (e.g. robot, press, welding device etc.) is provided with the very data it requires (in the examples above: e.g. machine program for controlling the robot, force to be applied on the press and temperature to be applied for welding).

Figure 1:
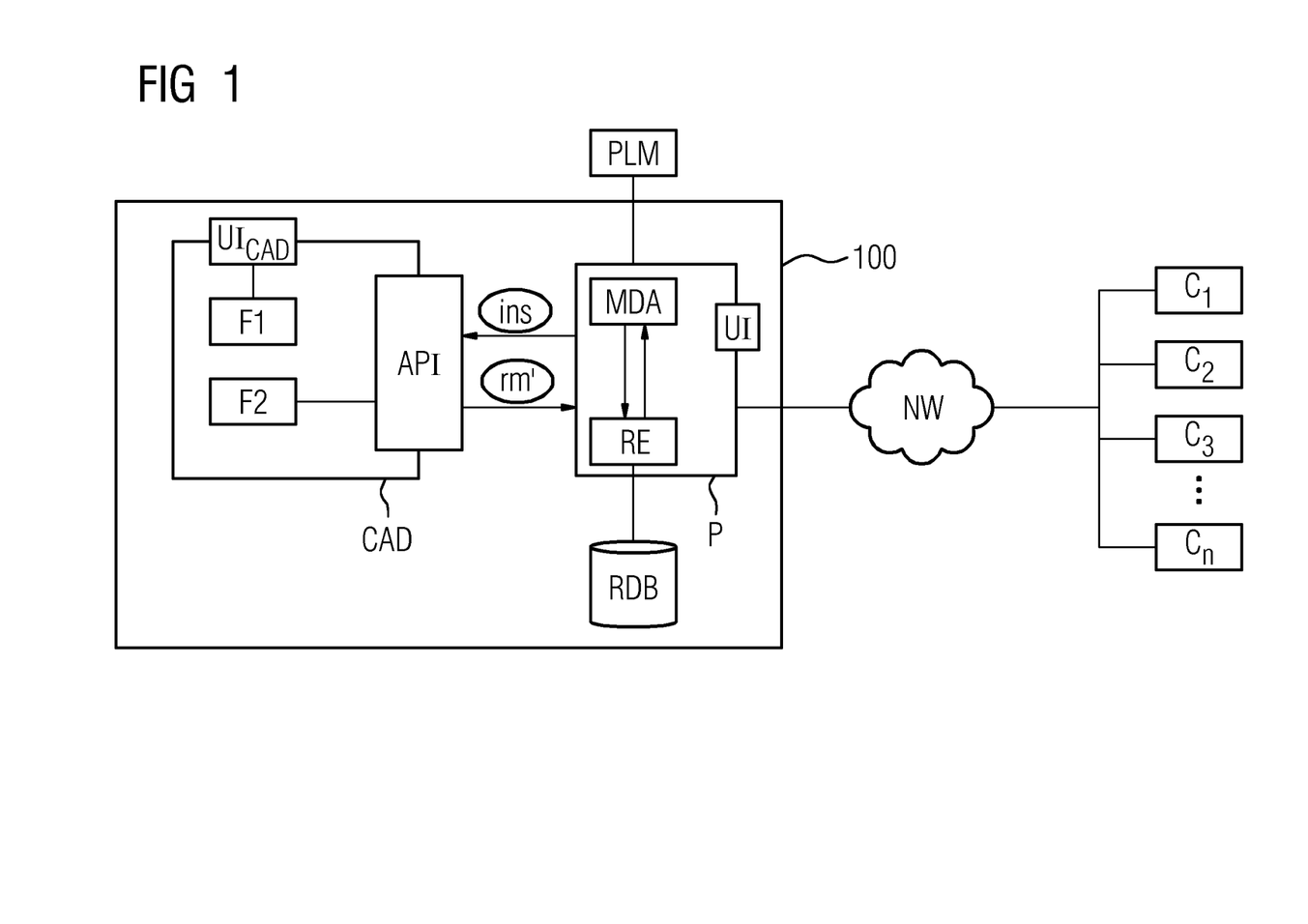
FIG. 1 shows a schematic representation of a reduction module for preparing a 3D model to be transmitted to a plurality of clients with different detail-states in an exemplary embodiment incorporating teachings of the present disclosure.

FIG. 1 shows a first example embodiment of the teachings herein in which the model detailing application MDA is deployed on a central computing node 100, which serves to manage a plurality of network connected receiving entities C which are computing entities, acting as clients for receiving the 3D model derivations, computed by the model detailing application MDA. In this example, the model detailing application MDA is deployed on a processor P, which in this example embodiment also comprises a user interface UI and a rules engine RE. The rules engine RE may be adapted to calculate instructions ins for controlling functions to be executed on a CAD system CAD for serving the model detailing application MDA with a result in the form of a calculated reduced reference version rm' of the original model m. The receiving entities (also called clients) C are connected to the model detailing application MDA via a network NW. The computing node 100 may be adapted to provide a product lifecycle management application PLM, which is adapted to distribute the data. In the example implementation, shown in FIG. 1, the PLM application may also be provided as external instance or computing node, which is connected to the MDA application via respective interfaces.

The model detailing application MDA may be deployed on the computing node 100 or even within the product lifecycle management application PLM. The model detailing application MDA may also be deployed within the CAD system.

The model detailing application MDA prepares the reduced reference version rm' for transmission to the respective client (and thus for the respective receiving entity or node C). The computing node 100 and the client may be connected via a secured network NW. The network NW may be a wired or a wireless network. The reduced reference version rm' is a derivative of the original model m and may in particular be a reduced form, an amended form or even an enriched form of the original model m. The derivatives are administered centrally by means of the PLM—and/or CAD system. The derivatives are linked to the original model m for making the changes traceable and processable.

The model detailing application MDA is adapted to calculate instructions, in FIG. 1 referenced with 'ins', for controlling functions in the CAD system. The instructions ins are calculated based on rules, which are stored in a rules database RDB. The rules are applied in the rules engine RE for computing the instructions ins by considering the provided detail-state.

The model detailing application MDA uses a set of functions F1, F2 of the CAD system CAD. It uses the API (application programming interface) to transmit instructions ins, prepared by the model detailing application MDA, to the CAD system. The CAD system comprise a (normal) user interface $UI_{CAD}$ for assessing a first set of functions. Via the application programming interface API of the CAD system, it is, however and in addition, possible to access the CAD kernel for hidden execution of a second set of functions F2 of the CAD application, which are not accessible via the normal user interface $UI_{CAD}$. The set of functions F1, F2 are controlled with instructions ins, computed by the model detailing application MDA in order to calculate the reduced reference version rm', which is transmitted via the model detailing application MDA to the respective clients C.

Figure 2:
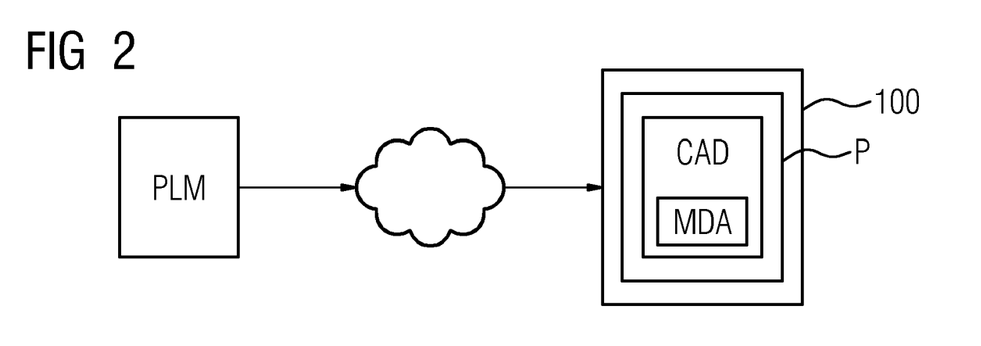
FIG. 2 is an alternative embodiment of the reduction module depicted in FIG. 1.

FIG. 2 shows another example embodiment, in which the model detailing application MDA is implemented or deployed in a computer aided design software module CAD. The CAD system is adapted to be processed on the processor P, which may be deployed in the computing node 100 (server). In this embodiment, the original 3D model is received locally on the computing node 100, but only the reduced reference version rm' of the original model m will be processed and provided on a user interface. In order to improve security, it may be assured that only the reduced reference version rm' will be made accessible (and not the original model m). The reduced reference version rm' may be provided to the PLM system PLM for distribution to the clients C.

Figure 3:
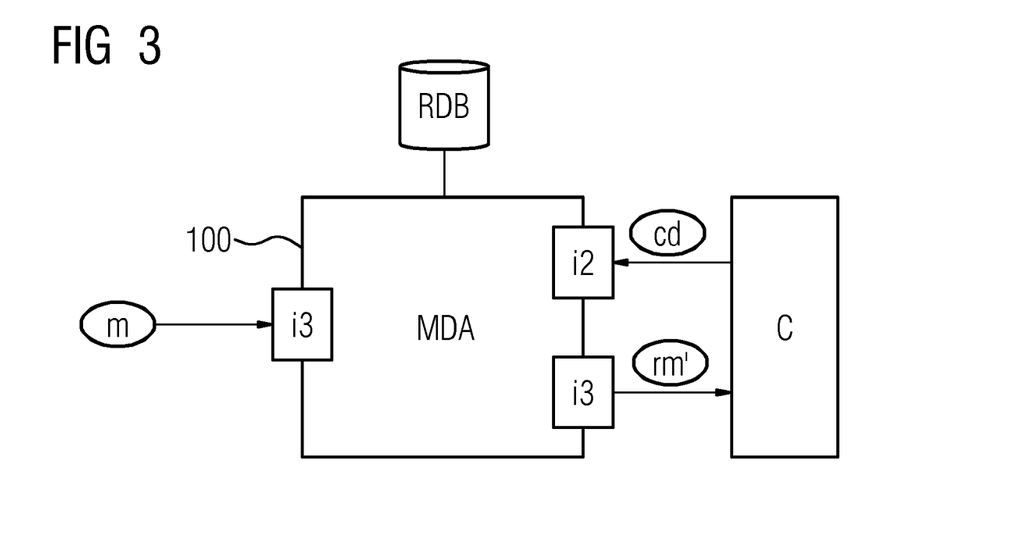
FIG. 3 shows the reduction module for preparing a 3D model for transmission to different clients in more detail.

FIG. 3 shows the model detailing application MDA in more detail. The model detailing application MDA is a computer application or program and may be deployed on a computing system centrally or locally. It receives electronic input data via respective interfaces, in particular the 3D model m via a first interface i1. Further, a detail-state is provided on the entity on which the application MDA is implemented or executed. For providing the detail-state several options do exist. In some embodiments, the detail-state is received via an interface from an external entity, e.g. directly from the client. In some embodiments, the detail-state is calculated locally on the computing device, where the model detailing application MDA is deployed. For this purpose, a requirement algorithm may be provided on the computing device 100. The requirement algorithm is adapted to process context data of the respective receiving entity C for processing the 3D model m, rm'. The context data are processed—e.g., by accessing the rules engine RE—in order to calculate a detail-state as a set of requirements for operating and executing the reduction algorithm. The context data may be received via a second interface i2. The detailing application MDA first generates a reference copy m' of the received 3D model, represented in the respective 3D model data m and then applies the reduction algorithm on the generated reference copy m' for calculating the reduced reference version rm', which is also a 3D model, but in an amended, modified, reduced or enriched version, dependent on the determined detail-state and requirements of the receiving entity C acting as client. It is called 'reduced reference model' or 'reduced reference version'. The calculated reduced reference version rm' may then be transmitted via a third interface i3 to the respective client according to a pre-determined transmission time interval or after a pre-determined event occurred. The third interface i3 may also be used to receive the original model m.

In some embodiments, the CAD system accesses or receives the original model m. By means of the model detailing application MDA functions within the CAD system are used to calculate a reduced reference version rm' of the original model m based on instructions of the model detailing application MDA, in particular by applying a reduction algorithm X2 based on the detail-state. The detail-state may indicate a detail scheme to be used during reduction or amendment of the reduction algorithm X2. The detail-state may also be received via a user input on a user interface. The process model is calculated as reduced reference model rm' and will be administered and managed centrally within the PLM system and in relation to the original model m.

Figure 4:
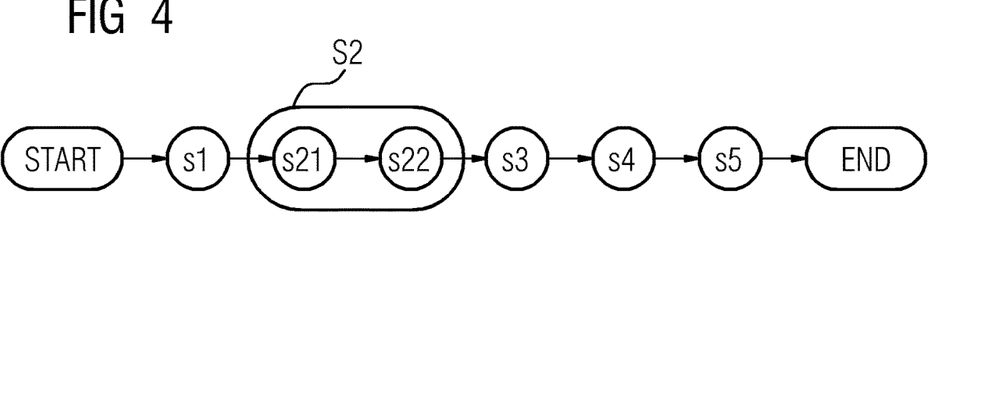
FIG. 4 is a flow chart of a method according to an example embodiment incorporating teachings of the present disclosure.

A typical workflow is explained below with respect to FIG. 4. After Start, in step S1 the 3D model data is received. In step S2 the detail-state is provided. In step S1 context data may be received and in step S2 the rules engine RE may be accessed in order to calculate the detail-state algorithmically, based on the received context data. In step S3 the reduction algorithm is executed and in step S4 the reduced reference version rm' of the 3D model is calculated and provided. In step S5 the calculated reduced reference version rm' is stored for transmission to the clients C and/or for further analysis. Thus, the model detailing application MDA is usually executed on a computing node with sufficient computing resources (processing/storage capacity etc.) and generates the reduced reference version rm' of the original 3D model and prepares the same for transmission to smart glasses AGR, which will be described in more detail below with respect to FIG. 5 or for the other clients C.

Figure 5:
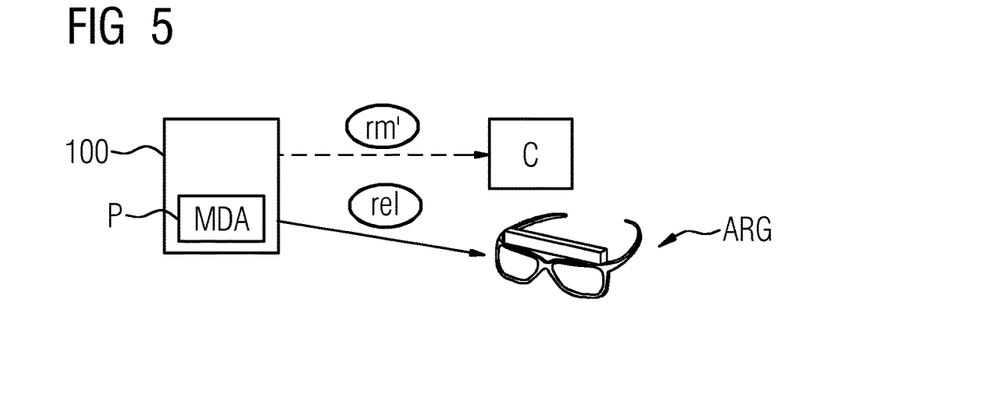
FIG. 5 represents an example embodiment and an application with augmented reality glasses.

FIG. 5 shows an example embodiment using smart glasses, e.g. augmented reality glasses ARG. The augmented or virtual reality glasses ARG may be associated to other receiving devices or entities C of the client, e.g. a beamer or a mobile device. The data exchange between the computing node 100 on which the model detailing application MDA is deployed and the smart glasses ARG is wireless. As depicted in FIG. 5 the reduced reference version rm' is provided on a CAD system or PLM system. Relevant data, shown in FIG. 5 with reference numeral 'rel' of the reduced reference version rm' are prepared for being transmitted to the smart glasses ARG and may optionally and in addition be transmitted to at least one other receiving entity of the client as well, which is represented in FIG. 5 with the transmission path shown in dotted lines. 'Relevant data' in this respect is to be construed as dedicatedly selected data for the respective process step, which is to be executed on the receiving device C.

Figure 6:
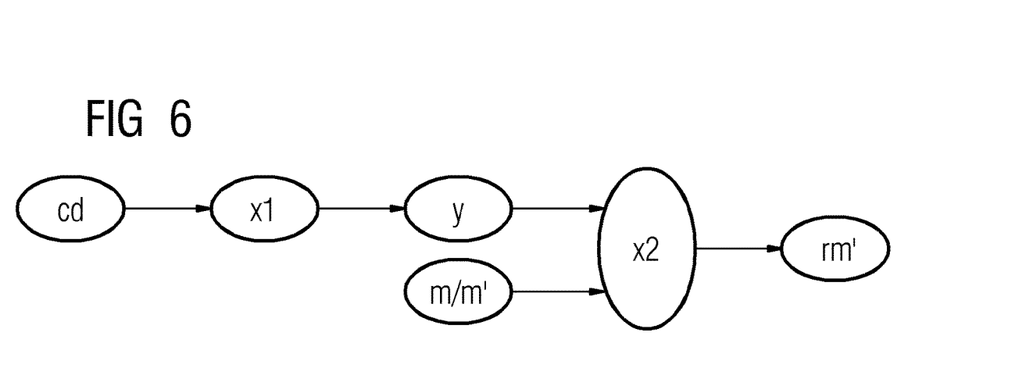
FIG. 6 is a flow chart of a possible sequence of algorithmic executions according to an example embodiment incorporating teachings of the present disclosure.

FIG. 6 shows another flow chart of the sequence of algorithmic executions according to an example embodiment. Context data cd are accessed and processed by the requirement algorithm X1 in order to calculate a detail-state y which is then forwarded with the reference version of the 3D model m' to the reduction algorithm X2 in order to process the reduced reference version rm' according to the requirements of the detail-state.

While the teachings of the current disclosure have been described in relation to various example embodiments, this description is for illustrative purposes only. For example, the computing node 100 or the processor P may be a personal computer, a server, a distributed system or a local system or even a mobile computing device or another technical apparatus, for example a smart glass, wherein the computing node 100 or the processor P are equipped with resources to execute a CAD system and functions thereof. Processing of the 3D model on the respective receiving entities may have different technical purposes and functionality. For the person skilled in the art it is clear that the teachings may also be used for other services besides production, like service and maintenance of systems and sales. Also, the model detailing application MDA together with the CAD system needs not to be deployed as physical application software. For example, it is also possible that the application functionality (reduction functionality) described above can be hosted in a virtualized environment as well. Accordingly, the scope of the teachings are not limited by the scope of the embodiments.

What is claimed is:

1. Method for preparing a three-dimensional Computer Aided Design (CAD) model for a fabrication component in the context of production for data transmission to different receiving entities, the method comprising:
receiving three-dimensional model data via an user input interface providing access to a first set of functions in a CAD application;
providing a detail-state for processing of the three-dimensional model on the respective receiving entity; and
executing a reduction algorithm on a reference version of the received three-dimensional model data for automatically calculating and providing a reduced reference version with the provided detail-state, the reduction algorithm removing at least one element of the three-dimensional model data and eliminating any reference to the at least one element;

wherein an application programming interface (API) interface of a CAD system may access a second set of functions of the CAD application;

wherein the second set of functions is not accessible to a user through the user input interface;

wherein the second set of functions includes instructions to execute the reduction algorithm including to: analyze versions of the three-dimensional model, amend and/or store versions of the three-dimensional model, aggregate different versions, and/or add context data or metadata to the three-dimensional model.

2. Method according to claim 1, wherein:

each receiving entity has an associated required detail-state; and providing comprises receiving context data specifying in which technical context the three-dimensional model will be used for processing on the receiving entity and accessing a rules engine with an associated rules database with the received context data to provide the detail-state algorithmically, indicating a respective level of detail in which the reduction algorithm should be operated with.

3. Method according to claim 1, wherein the reduction algorithm deletes, adds, and/or modifies determined elements in the reference version of the 3D model based on the provided detail-state and all references to the determined elements are deleted.

4. Method according to claim 1, further comprising storing the reduced reference version of the 3D model with a digital reference to the 3D model.

5. Method according to claim 1, wherein the context data specify a context and/or a functionality in which the 3D model is intended to be used on the receiving entity.

6. Method according to claim 1, further comprising providing the reduced reference version on smart glasses of a receiving entity.

7. Method according to claim 1, wherein the method is executed in a batch mode in a central management system and/or in a local application.

8. Method according to claim 1, further comprising comparing the reduced reference version to the three-dimensional model.

9. Reduction system for preparing a three-dimensional model for a fabrication component in the context of production for data transmission to different receiving entities, the system comprising:

an user input interface for receiving 3D model data providing access to a first set of functions in a CAD application; and a processor for providing a detail-state of a receiving entity for processing the three-dimensional model;

wherein the processor is programmed to execute a reduction algorithm on a reference version of the received 3D model data for automatically calculating and providing at least one reduced reference version thereof with the provided detail-state, the reduction algorithm removing at least one element of the three-dimensional model data and eliminating any reference to the at least one element;

an application programming interface (API) interface of a CAD system providing access to a second set of functions of the CAD application;

wherein the second set of functions is not accessible to a user through the user input interface;

wherein the second set of functions includes instructions to execute the reduction algorithm including to: analyze versions of the three-dimensional model, amend and/or store versions of the three-dimensional model, aggregate different versions, and/or add context data or metadata to the three-dimensional model.

* * * * *